United States Patent [19]

Katagiri et al.

[11] Patent Number: 4,498,559

[45] Date of Patent: Feb. 12, 1985

[54] FRICTION-PAD WEAR-LIMIT WARNING DEVICE FOR DISC BRAKES

[75] Inventors: Masayoshi Katagiri, Toyota; Toshio Kondo, Okazaki, both of Japan

[73] Assignees: Toyota Jidosha Kogyo Kabushiki Kaisha, Toyota; Aisin Seiki Kabushiki Kaisha, Kariya, both of Japan

[21] Appl. No.: 368,412

[22] Filed: Apr. 14, 1982

[30] Foreign Application Priority Data

Oct. 27, 1981 [JP] Japan .......................... 56-159753[U]
Oct. 27, 1981 [JP] Japan .......................... 56-159754[U]

[51] Int. Cl.$^3$ ............................................. F16D 63/00
[52] U.S. Cl. .................................... 188/1.11; 116/208
[58] Field of Search ................ 188/1.11, 73.38, 73.36; 192/30 W; 116/208

[56] References Cited

U.S. PATENT DOCUMENTS

| | | | |
|---|---|---|---|
| 3,141,524 | 7/1964 | Mishler | 188/1.11 |
| 3,958,666 | 5/1976 | Hooten et al. | 188/1.11 |
| 4,037,689 | 7/1977 | Maehara | 188/1.11 |

FOREIGN PATENT DOCUMENTS 2800501 7/1978 Fed. Rep. of Germany ..... 188/1.11

*Primary Examiner*—Bruce H. Stoner, Jr.
*Assistant Examiner*—Robert J. Oberleitner
*Attorney, Agent, or Firm*—Oblon, Fisher, Spivak, McClelland & Maier

[57] ABSTRACT

A wear-limit warning device for a vehicle disc brake, warning the vehicle driver that a maximum permissible wear limit is reached on the friction pad or pads. The warning device comprises a projection protruding sideways from the end face of a backing plate of each friction pad, and a warning member made from a spring sheet material. The warning member consists of a mounting leg portion, a contact portion and a spring portion connecting the leg and contact portions. The leg portion having a pair of legs which grip therebetween an end portion of the backing plate and the protruding projection thereby attaching the warning member to the backing plate and preventing the same from being shifted out of position during service. The contact portion extends along the end face of the projection until its end reaches a permissible wear limit level of the friction member of the friction pad, and is pressed against the end face of the projection with a resilient force of the spring portion. When the wear limit is reached, the end of the contact portion comes into contact with the friction surface of the rotating brake disc rotor and the contact portion vibrates with oscillatory movements of the end in abutment on the friction surface due to stick-slip, thereby generating a warning sound.

13 Claims, 13 Drawing Figures

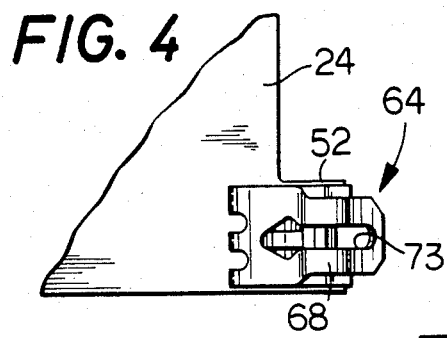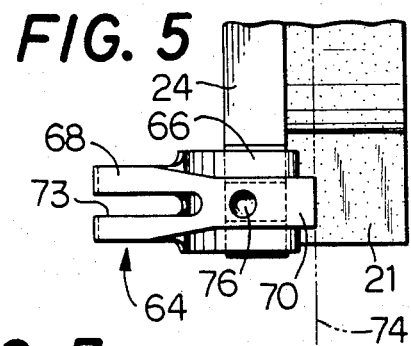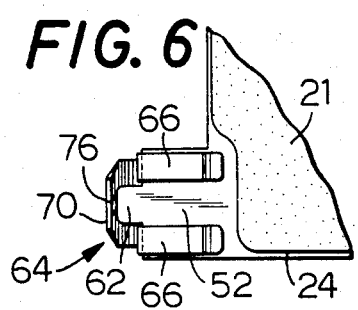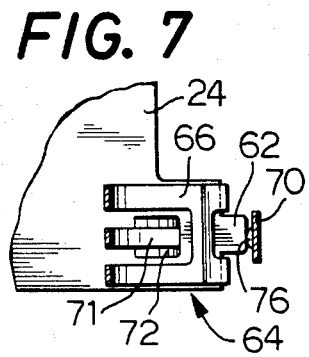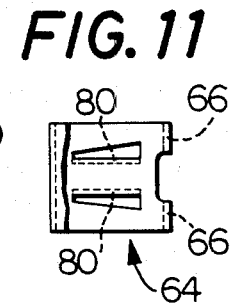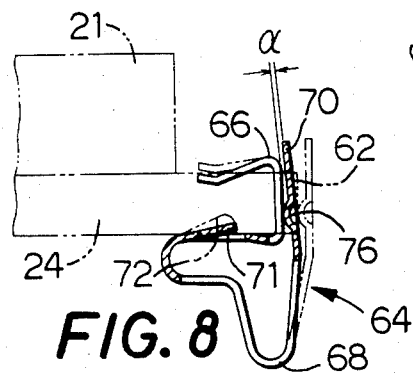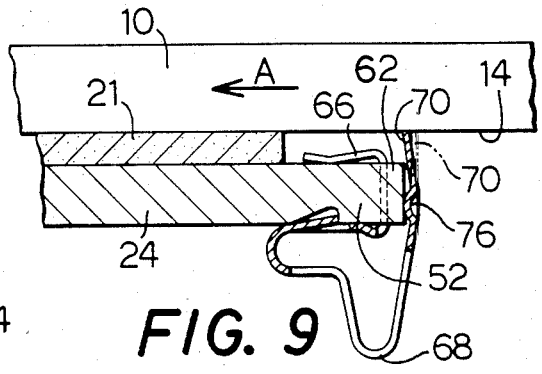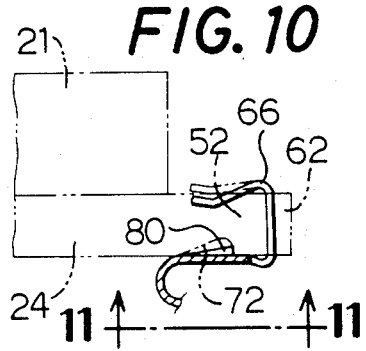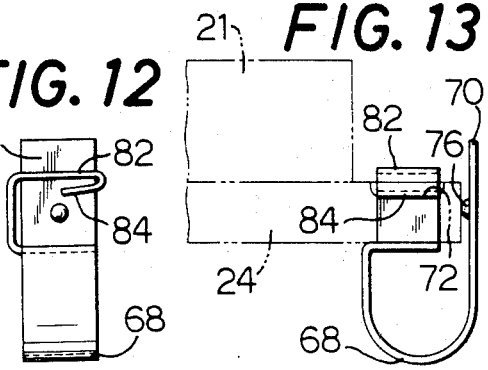

FRICTION-PAD WEAR-LIMIT WARNING DEVICE FOR DISC BRAKES

BACKGROUND OF THE INVENTION

This invention relates to a wear-limit warning device for use in a vehicle disc brake, which warns the driver that a permissible wear limit of the friction pads has been reached, for informing of the necessity of replacing the worn-out pads.

Friction pads of a disc brake are each provided with a friction member disposed facing the friction surface of the disc rotor, and a backing plate secured to the rear surface of the friction member. The friction pads are pressed against the disc rotor upon actuation of the brake by an actuator thereby restraining rotational movements of the rotor, and are supported by a torque member so that they are movable along the axis of the rotor. The friction pads whose friction members are worn during service are required to be replaced when the amount of wear of the friction members has reached their permissible limit. For this reason, there have been proposed various wear-limit warning devices which inform the vehicle driver that the permissible wear limit of the friction member has been reached. Some novel wear limit devices were also developed by the inventors of the present invention, for which a U.S. Pat. No. 343,476 was filed on January 28, 1982. Those devices are characterized by the use of a warning member made from a sheet material which comprises: a mounting leg portion which is fixed to the sidewise end portion of the backing plate of the friction pad; a contact portion extending along the sidewise end face of the backing plate, with its free end reaching a wear limit level; and a spring portion connecting the mounting leg and contact portions in a space behind the rear surface of the backing plate, and producing a resilient force with which the contact portion is pressed against the sidewise end face of the backing plate or the mounting leg portion. When the wear limit of the friction member has been reached, the free end of the contact portion comes into contact with the rotating disc rotor and generates an extremely clear warning sound.

SUMMARY OF THE INVENTION

The present invention was made for the purpose of further improving the wear-limit warning devices as described above. In other words, the later study and research of the inventors revealed that, in the wear-limit warning devices, a more stable vibration of the contact portion and consequently a clearer warning sound could be obtained as a greater force is used to keep the contact portion pressed against the backing plate. It is according an object of the present invention to provide a wear-limit warning device which can completely satisfy the above condition with means as simple as possible.

For attaining this object, a wear-limit warning device according to the present invention comprises: (1) a projection or tab protruding sideways from the sidewise end face of the backing plate, and (2) a warning member made from a sheet material which includes a mounting leg portion constituted by a pair of U-shaped legs gripping therebetween a sidewise end portion of the backing plate on both front and rear sides thereof and further gripping therebetween the said tab on both upper and lower sides thereof; a contact portion extending along the sidewise end face of the tab with the free end reaching a wear limit level of the friction member; and a spring portion connecting the said mounting leg portion and the contact portion and generating a resilient force with which the contact portion is pressed against the said tab.

With the above construction, the warning member may be easily installed such that the tab protruding between the pair of legs toward the contact portion supports the contact portion in abutment thereon while resisting the resilient force of the spring portion and maintaining a given distance between the mounting leg portion and the contact portion. Put in the other way, installation of a warning member on the backing plate with the contact portion in contact with the backing plate with a sufficient force requires a given amount of displacement of the contact portion away from the backing plate against a resilient force of the spring portion in order for the backing plate to support the contact portion in abutment thereon. However, when the backing plate was not provided with a tab according to this invention, the requirement for attaching the mounting leg portion of the warning member itself to that portion of the backing plate makes it necessary to fabricate the warning member in such manner that the contact portion is in contact with the mounting leg portion with a given resilient force of the spring portion before the warning member is installed. In view of the common practice wherein the warning member is fabricated of sheet material by a bending process which inherently suffers a spring-back problem, it is not easy to fabricate the warning member in the above manner. In a wear-limit warning device in accordance with the present invention, however, wherein a tab protruding from the backing plate between a pair of legs of the mounting leg portion supports the contact portion of the warning member in abutment thereon while resisting the resilient force of the spring portion and maintaining the contact portion away from the mounting leg portion, it is not necessary to keep the contact portion in contact with the mounting leg portion with a given force before installation of the warning member. The above described tab provided on the backing plate is further advantageous and extremely useful as a positioning means for maintaining the warning member in its predetermined mounting position. This advantage of the said tab will be appreciated by considering the inevitable phenomenon that the contact portion intensely vibrates upon generation of a warning sound when the wear limit is reached and that this vibration of the contact portion transfers to, and consequently vibrates, the warning member as a whole, thereby tending to cause the warning member to be shifted out of its predetermined original position. In the wear-limit warning device of this invention, however, such shifting of the warning member out of position is effectively avoided by the pair of legs of the mounting leg portion which grips therebetween the tab of the backing plate on its both upper and lower sides.

It is another object of this invention to provide a wear-limit warning device whose warning member can be attached to the backing plate with utmost ease and has no chance of removal off the backing plate due to the intense vibration thereof upon generation of a warning sound. The essential feature of the warning device according to the invention lies in that the warning member made from a sheet material comprises: a mounting leg portion bent to form a U-shape, a pair of arms of the mounting leg portion gripping the backing plate therebetween on both front and rear sides of the plate; an engagement pawl protruding inwardly obliquely from at least one of the arms so that the amount of inward protrusion is gradually increased from the open end toward the bottom of the U-shape; and a mating recess or recesses formed in the backing plate of the friction pad, which receive the engagement pawls for engagement therewith when the mounting leg portion is in attachment to the backing plate.

With the above arrangement, the mounting leg portion may be extremely readily attached to the backing plate with the engagement pawl easily put into engagement with the mating recess through elastic deformation of the pawl itself or the mounting leg portion. In addition, once the mounting leg portion is attached the engagement pawl engaging the recess securely prevents the mounting leg portion from being separated from the backing plate, thereby preventing the warning member from being removed off the backing plate when a warning sound is generated.

BRIEF DESCRIPTION OF THE DRAWINGS

FIG. 4 is a view taken on line 4—4 of FIG. 3;

FIG. 5 is a view taken on line 5—5 of FIG. 3;

FIG. 6 is a view taken on line 6—6 of FIG. 3;

FIG. 7 is a sectional view taken on line 7—7 of FIG. 3;

FIG. 8 is a sectional plan view showing the form of a warning member of the wear-limit warning device according to the first preferred embodiment before installation thereof in comparison with that of the same as installed;

FIG. 9 is a sectional plan view showing the status of the wear-limit warning device according to the first preferred embodiment in which it generates a warning sound;

FIG. 10 is a sectional plan of an essential part of a warning member of another a second preferred embodiment of the invention;

FIG. 11 is a view taken on line 11—11 of FIG. 10;

FIG. 12 is a side view of a warning device of a third preferred embodiment of the invention; and FIG. 13 is a plan view of the warning device of FIG. 12.

DETAILED DESCRIPTION OF THE PREFERRED EMBODIMENTS

Referring now more particularly to the drawings, there are described in detail several preferred embodiment of the present invention. Such description is intended to illustrate the invention for easy understanding thereof, and it is to be understood that the invention is not limited to those preferred embodiments.

Figure 1:
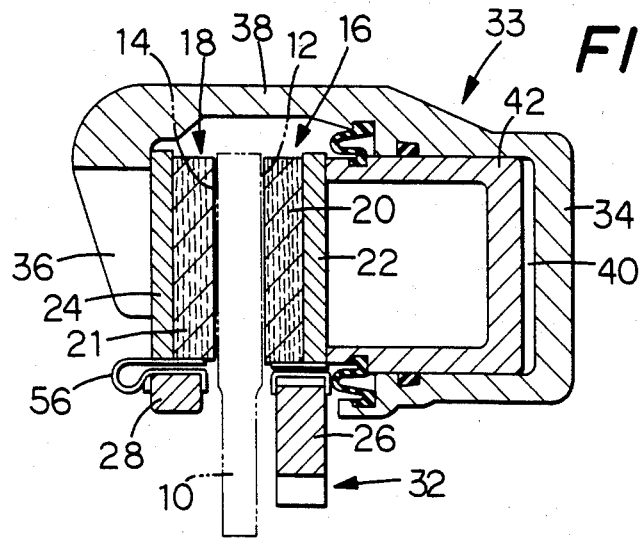
FIG. 1 is a sectional side elevation of a disc brake having a first preferred embodiment of a friction-pad wear-limit warning device according to the present invention.

In FIG. 1, numeral 10 designates a disc rotor which is rotated with a vehicle wheel. The disc rotor 10 is provided, on opposite sides of its radially outward portion, friction surfaces 12 and 14. Facing the respective friction surfaces, there are disposed an inner pad 16 and an outer pad 18 each of which consists of a friction member 20, 21 and a steel backing plate 22, 24 fixed to the rear face of the friction member, respectively. The inner and outer pads 16, 18 are supported slidably along the axis of the disc rotor 10 by a torque member 32 which is formed of pad supporting portions 26 and 28 disposed on both sides of the disc rotor 10, and of a connecting portion 30 extending over the periphery of the disc rotor 10 between the supporting portions 26 and 28 to connect them. In this respect, a further description is to be given later. The pads 16 and 18 are forced against the surfaces of the disc rotor 10 by a caliper 33. The caliper 33 comprises: a hydraulic cylinder portion 34 which is formed opposite to the rear face of the inner pad 16; a reaction portion 36 which is provided opposite to the outer face of the outer pad 18, and a connecting portion 38 extending over the periphery of the disc rotor 10 between the cylinder and reaction portions to connect them. The caliper 33 is supported movably along the axis of the disc rotor 10 by a pair of slide pins (not shown) supported by the torque member 32. With this arrangement, when a cylinder bore 40 in the cylinder portion 34 is fed with brake fluid, a piston 42 forces the inner pad 16 against the friction surface 12 of the disc rotor 10, and the reaction portion, by reaction, forces the outer pad 18 against the friction surface 14.

Figure 2:
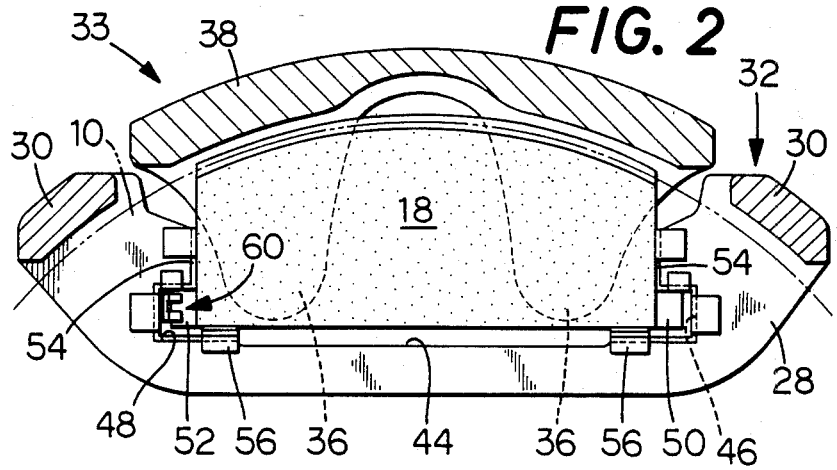
FIG. 2 is a sectional front elevation of the disc brake of FIG. 1.
Figure 3:
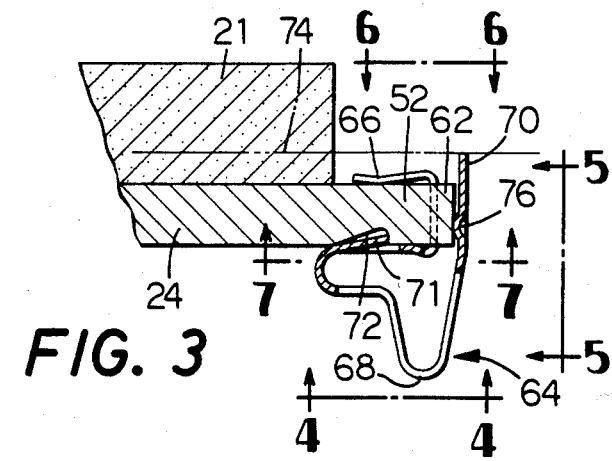
FIG. 3 is the first enlarged sectional plan of an preferred embodiment of a friction-pad wear-limit warning device of the invention.

While here is described in detail the manner in which the pads 16, 18 are supported by the torque member 32, the description refers only to the supporting manner with respect to the outer pad 18 and the description on the inner pad 16 is omitted because the same manner applies to both pads. The pad supporting portion 28 has a substantially rectangular, pad accommodating opening 44 as seen in FIG. 2. In portions of the supporting member 28 on both sides of the opening 44 and near the bottom of the same, there are formed small rectangular recesses 46, 48. The backing plate 24 of the outer pad 18 is equipped with ears 50 and 52 which are protruded outwardly from both lower sidewise end portions of the plate. The outer pad 18 is accommodated in the opening 44 with the ears 50 and 52 in engagement with the said small recesses 46 and 48, respectively. Between the contact surfaces of the backing plate 24 and the pad supporting portion 28 are interposed stainless steel anti-corrosion members 54 each of which is integral with an anti-rattle spring 56 preventing rattling movements of the outer pad 18. In this connection, the anti-rattle springs for the inner pad 16 are different in configuration from those for the outer pad 18.

At one of the ears 52 of the backing plate 24, there is provided a wear limit warning device 60 which is illustrated in enlargement in FIGS. 3 through 8. The wear limit warning device 60 consists of a tab 62 extending outwardly from the end of the ear 52 which is a part of the backing plate 24, and a warning member 64 fabricated of a spring stainless steel sheet. As most clearly shown in FIG. 3, the warning member 64 consists of a mounting leg portion 66, a spring portion 68 and a contact portion 70.

While the mounting leg portion 66 is substantially U-shaped, having a pair of arms which grip the ear 52 on both front and rear sides thereof, it is fabricated so that the U-shaped portion is kept narrower or slightly closed at its open end, as indicated by solid line in FIG. 8, until it is attached to the ear. When the warning member 64 is installed, the narrow open end part of the leg portion 66 is expanded and the leg portion is attached to the ear 52 is shown by two-dot broken line in FIG. 8. This mounting leg portion 66 is provided, as clearly seen in FIGS. 6 and 7, in the form of a pair of parallel legs 66 which engage the said tab 62 on both upper and lower sides for preventing the leg portion 66 from vertically moving along the surfaces of the ear 52. The pair of legs 66 merge at one end of the leg portion where it terminates into the spring portion 68, and the merged portion is provided with an engagement pawl 71. As clearly seen in FIGS. 3 and 7, the engagement pawl 71 is an integral part of the warning member, which is bent inwardly of the U-shaped portion and protruded obliquely from the open end toward the bottom of the same for engagement with an engagement recess 72 formed in the rear surface of the ear 52. The engagement recess 72 is formed with a depth which increases from the inward base end toward the outward end of the ear 52, and with a shoulder face at the end nearer to the outward end of the ear 52, against which shoulder face the free end of the engagement pawl 71 is abutted thereby preventing the warning member 64 from moving off the ear 52 from the inward base end toward the outward end. The engagement pawl 71 engaging this shoulder face further acts, in cooperation with the outward end face of the ear 52 contacting the inner surfaces of the pair of mounting legs 66, to prevent the warning member 64 from turning in a plane parallel to the backing plate 24. In addition, the engagement pawl 71 which is fabricated so that its inwardly oblique protrusion is gradually increased as it extends from the open end toward the bottom of the U-shaped leg portion 61, is elastically deformed by the ear 52, when the leg portion is installed thereon, until it runs substantially parallel with the pair of arms of the leg portion 66 whereby no trouble is encountered in installing the warning member.

As clearly shown in FIGS. 4 and 5, the spring portion 68 is made up of a first and a second part of U-shape. The first bent part is formed so that the letter U is open sideways from the central part of the pad substantially toward the contact portion 70 (open radially outwardly of the pad) and the second bent part is formed so that the letter U is open toward the rear surface of the backing plate 24 or substantially toward the mounting leg portion 66. As clearly illustrated in FIGS. 4 and 5, the spring portion 68 has in the transversely central portion an elongated opening 73 along the length of the warning member, which opening is intended to adjust a spring constant of the first and second bent parts. The spring portion 68 terminates at one end thereof into the planar contact portion 70 which extends from the rear side to the front side of the backing plate 24, passing along the end face of the ear 52. The free end of the contact portion is flush with a brake-pad wear limit level 74 indicated by two-dot broken line in FIG. 3. The contact portion 70 has, in its transversely central position, a boss 76 protruding toward the ear 52, which boss is placed due to resiliency of the spring portion 68 in contact with the end face of the tab 62 extending outwardly from the end of the ear 52 which is a part of the backing plate 24. In other words, the contact portion 70 is fabricated so that it is positioned in close proximity to the mounting leg portion 66 as indicated by solid line in FIG. 8 before the warning member is installed, while the same portion 70 is pressed through the tab 62 away from the leg portion 66 against the resiliency of the spring portion 68 to the position as indicated by two-dot broken line in FIG. 8 when the warning member is installed. Having described the warning device 60 provided for the outer pad 18, it is possible to provide the identical wear limit warning device for the inner pad 16 as well, and also possible to provide the warning device 60 for only either one of the inner and outer pads 16 and 18 that is expected to wear out earlier than the other because it is a common practice to replace both pads at the same time.

In a disc brake equipped with the wear limit warning device 60 constructed as described above, a warning is given in the following manner when the amount of wear of the friction member 21 of the outer pad 18 reaches the wear limit.

When the wear limit is reached on the friction member 21, the end of the contact portion 70 of the warning member 60 comes into contact with the friction surface 14 of the disc rotor 10 as seen in FIG. 9. While the vehicle is running forward, the disc rotor 10 is rotating in the direction indicated by arrow A as viewed in FIG. 9 whereby the contact portion 70 with its end in contact with the friction surface 14 is pulled by friction therebetween in the rotating direction of the disc rotor 10 and deflected as shown by solid line in the same figure, and subsequently returned to the original position due to the resilient force of the warning member 60. The repetition of the above movements of the contact portion 70 results in an intense vibration of the same with the boss 76 kept in contact with the tab 62 of the ear 52 thereby causing a warning sound to be generated. The natural vibration frequency of the contact portion 70 is determined by a specific distance between the free end of the contact portion and the point of contact of the boss 76 with the tab 62. In the event the boss 76 was moved off the tab 62 at this time the vibration of the contact portion 70 would be unstable and consequently a clear warning sound of an intended frequency could not be obtained. In the present embodiment, however, the boss 76 is forced against the tab 62 with a sufficient force and this assures the generation of a stable and clear warning sound. In addition, this embodiment is advantageous in that the contact portion 70 need not be made in contact with the mounting leg portion 66 before installation of the warning member 64 in order to allow the warning member to produce a sufficient force with which the boss 76 is pressed against the tab 62 upon installation of the warning member because of the presence of the tab 62 which itself acts to press the contact portion 70 away from the mounting leg portion 66 when the warning member 64 is installed. This means that it is enough to fabricate the warning member so that the contact portion 70 is positioned in proximity with the mounting leg portion 66, as indicated in FIG. 8, with a distance of α therebetween which is a permissible spring-back amount in bending the warning member 64 into shape during the manufacture. Thus, the warning member 64 may be fabricated with extreme ease in this respect. Another advantage of the present embodiment resides in the provision of the first bent part of the spring portion 68 of the warning member 64, which effectively permits the contact portion 70 to move in the direction normal to the friction surface 14 and promotes the development of a sort of stick-slip motion of the contact portion 70 in returning to the original position after it is once pulled in the rotating direction of the disc rotor 10 upon abutment of the contact portion against the rotor, thereby allowing the contact portion to produce a stable warning sound. While the entire part of the warning member other than the contact portion 70 intensely vibrates upon generation of such warning sound, the engagement of the engagement pawl 71 with the engagement recess 72, and of the mounting leg portion 66 with the tab 62 securely prevents not only removal of the warning member 64 but also displacement of the same out of its mounting position.

While, in the above embodiment, the warning member is attached to the ear 52 of the backing plate 24, the mounting position is not necessarily limited to the ear 52, i.e., the warning member may be mounted at any sidewise end portion of the backing plate of the friction pad. Therefore, a tab formed on the backing plate is only required to protrude sideways of the plate from a portion of the sidewise end face on which the warning member is mounted.

Further, the spring portion of the warning member does not have to have two bent parts as in the above embodiment as long as it connects the mounting leg and contact portion and is capable of producing a spring or resilient force by which the contact portion is pressed with a given force against a tab formed on the backing plate.

In addition, it is possible to use various types of means for preventing the mounting leg portion from being removed off the backing plate, in place of the combination of the said engagement pawl 71 and recess 72. For example, it is possible to use a pair of engagement pawls 80 of a shape indicated in FIGS. 10 and 11 instead of a tongue-shaped engagement pawl as used most suitably in the previous embodiment. These engagement pawls 80 are a pair of substantially triangular parallel protrusions each formed, by cutting and bending, of a part of the arm of the mounting leg portion 66. The pawls 80 fit in engagement recesses 72 having a similar configuration as that of the recess 72 used in the previous embodiment, thereby preventing the leg portion 66 from being removed off the ear 52. The engagement pawls 80 of this embodiment are not elastically deformable and therefore the elastic deformation of the mounting leg portion 66 permits the pawls 80 to engage the engagement recesses 72. It is also possible that the warning member adopts a mounting leg portion 82 and an engagement pawl 84 as shown in FIGS. 12 and 13. The leg portion 82 is mounted on the ear 52 not from the sidewise end of the backing plate 24 but from the bottom of the same, and the engagement pawl 84 is formed by bending acutely the end portion of one of the arms of the leg portion 82. The function and effect of the engagement pawl 84 is substantially identical to the tongue-shaped pawl 71 previously described. It is further possible to use a combination of a hemispherical projection protruding inwardly of the mounting leg portion as an integral part thereof, with a mating round hole formed in the backing plate. Although it is preferable to form an engagement pawl or projection on that one of a pair of arms of the U-shaped mounting leg portion which is nearer to the spring portion to stably hold the warning member on the backing plate, and most preferable to provide the same on both arms, the engagement pawl formed on the other arm which is more remote from the spring portion may prevent removal of the warning member from the backing plate.

It will be obvious that various modifications and variations other than as specifically described of the present invention may be made without departing from the scope of the appended claims.

What is claimed is:

1. A friction-pad wear-limit warning device for a disc brake including a disc rotor, a torque member and a pair of friction pads each having a friction member and a backing plate fixed thereto, supported by said torque member and forced against the mating friction surface of said disc rotor for restraining rotation of said disc rotor, said wear-limit warning device generating a warning sound when a wear limit of said friction member is reached, said warning device comprising:

a projection protruding sideways from a sidewise end face of said backing plate; and a warning member made from a sheet material which has: a mounting leg portion gripping a sidewise end portion of said backing plate on both front and rear sides thereof and further gripping said projection on both upper and lower sides thereof; a contact portion extending along and being in contact with a sidewise end face of said projection with a free end of said contact portion reaching a wear limit level of said friction member; and a spring portion connecting said contact portion to said mounting leg portion and generating a resilient force, said contact portion being pressed against said sidewise end face of said projection by the resilient force of said spring portion and being forced away from said mounting leg portion by said projection, whereby, when said wear limit of said friction member is reached, said free end of said contact portion comes into contact with said mating friction surface of the rotating disc rotor and said contact portion vibrates, generating said warning sound, but a part of said contact portion is kept in contact with said sidewise end face of said projection by the resilient force of said spring portion, thereby assuring the generation of a stable and clear warning sound.

2. A warning device as recited in claim 1, wherein said sidewise end portion of said backing plate is an outwardly protruding ear slidably received within a mating recess formed in said torque member for quiding an assoiacted one of said pair of fiction pads axially of said disc rotor, said ear supporting said warning member in place.

3. A warning device as recited in claim 2, wherein said projection is a tab extending outwardly from a sidewise end face of said protruding ear.

4. A warning device as recited in claim 1, wherein said mounting leg portion has a pair of parallel legs engaging said upper and lower sides of said projection, respectively, for preventing said mounting leg portion from moving vertically along the surface of said backing plate.

5. A warning device as recited in claim 1, wherein said spring portion has two U-shaped bent parts one of which is open radially outwardly of said friction pads substantially toward said contact portion, and the other of which is open axially of said disc rotor substantially toward said mounting leg portion.

6. A warning device as recited in claim 1, wherein said spring portion has an elongated opening along said spring portion for establishing an intended spring constant thereof.

7. A warning device as recited in claim 1, wherein said contact portion includes a boss protruding toward said projection with its end kept in contact with said sidewise end face of said projection, said boss being disposed such that a distance from said free end of said contact portion to a point of contact of said boss with said sidewise end face of said projection determines an intended natural vibration frequency of said contact portion.

8. A warning device as recited in claim 1, wherein said mounting leg portion is of U-shape and includes a pair of arms contiguous with said front and rear sides of the backing plate, respectively, and said spring portion includes an engagement protrusion engaging said rear side of the backing plate for preventing said warning member from moving toward the outward end of said projection.

9. A warning device as recited in claim 1, wherein said mounting leg portion is bent to form a U-shape having a pair of arms which constitute opposite arms of said U-shape, said pair of arms gripping therebetween said sidewise end portion of the backing plate, and said leg portion includes at least one engagement pawl protruding inwardly obliquely from said mounting leg portion, an amount of inward protrusion thereof gradually increasing from an open end of said U-shape toward a bottom of the same, said at least one engagement pawl engaging at least one recess formed in said backing plate while said mounting leg protion is attached to said backing plate, thereby preventing said mounting leg portion from being removed off said backing plate.

10. A warning device as recited in claim 9, wherein said at least one engagement pawl is a tongue bent inwardly from said mounting leg portion which is contiguous with said rear side of said backing plate, and said at least one recess is a recess formed in said rear side of said backing plate.

11. A warning device as recited in claim 9, wherein said at least one engagement pawl is a pair of substantially triangular parallel protrusions provided on said mounting leg portion which is contiguous with said rear side of said backing plate, each of said triangular protrusions being formed along the length of said warning member by cutting and bending a part of said mounting leg portion, and said at least one recess is a pair of recesses formed in said rear side of said backing plate.

12. A warning device as recited in claim 9, wherein said at least one engagement pawl is an acutely bent end portion of one of said pair of arms of said mounting leg portions, and said at least one recess is a recess disposed so as to engage said bent end portion of said one of the arms.

13. A warning device as recited in claim 9, wherein said at least one engagement pawl protrudes inwardly obliquely from the parts of said U-shaped leg portion which grip said backing plate on the front and rear sides thereof.

* * * * *